Figure 1:
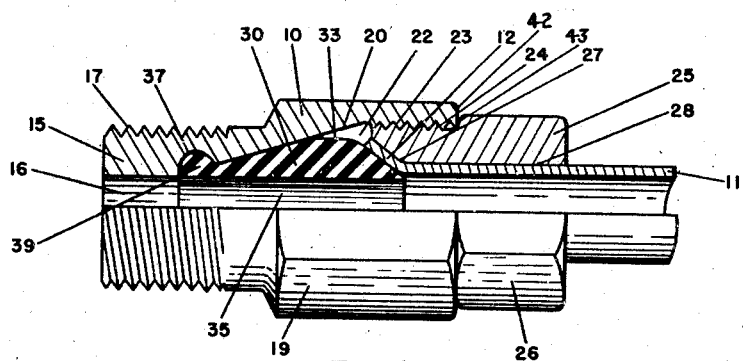

May 20, 1947.  R. E. HEROLD  2,420,778

TUBE COUPLING

Filed Feb. 15, 1945

ROBERT E. HEROLD
INVENTOR

ATTORNEY

Patented May 20, 1947

2,420,778

UNITED STATES PATENT OFFICE 2,420,778

TUBE COUPLING

Robert E. Herold, Cleveland, Ohio, assignor to The Weatherhead Company, Cleveland, Ohio, a corporation of Ohio Application February 15, 1945, Serial No. 578,040

9 Claims. (Cl. 285—86)

This invention relates to tube couplings, and more particularly to couplings for tubes having flared ends.

Flared tube couplings are used extensively, particularly for making connections with tubing used in the hydraulic, fuel, compressed air and vacuum systems of aircraft, in the fuel and hydraulic brake systems of automotive vehicles of various types, and in connection with hydraulically actuated machine tools. The ordinary flared tube coupling comprises a body member having a conical seating surface against which the flared end of the tube is clamped by a nut which makes threaded engagement with the body and is provided with a conical seating surface (either formed integrally with the nut, or in a separate sleeve) which engages the exterior of the flared end of the tube. These couplings have been satisfactory for many purposes, but have been subject to difficulties especially in high pressure installations, and services where severe vibrations are encountered, in that the seal between the body of the coupling and the end of the tube depends upon the pressure with which the flared end is clamped by the nut against the metallic seat in the body. If the nut and body are screwed together with insufficient force, the connection will leak, while excessive force will damage the flared end of the tube. In high pressure installations, the clamping force necessary to effect a seal is often so great that the flare of the tube is substantially reduced in thickness after the tube has been disconnected and reconnected to the body a few times, increasing the possibility of failure at the flare. Furthermore, the flared end of the tube is clamped between rigid metal seats with the result that vibratory stresses are concentrated at the base of the flare, and the tube therefore is subject to failure at this point due to vibration.

A general object of the present invention, therefore, is the provision of a flared tube coupling in which the above noted difficulties are overcome. More specifically, an object of the invention is the provision of a flared tube coupling which will be leak proof under high pressure even though tightened only finger tight. Another object is the provision of a flared tube coupling in which the operation of connecting a tube in the coupling will not damage the flare, and which therefore can be disconnected and reconnected many times without damage or loss of strength. Another object is the provision of a flared tube coupling in which the tube will withstand severe vibration for long periods of time without failure.

Another object is the provision of a flared tube coupling in which the tube is firmly gripped to prevent it from being blown out of the coupling by pressure within the tube, and in which the sealing and clamping pressures vary with the fluid pressure within the tube, whereby excessive clamping pressures and resultant damage to the flare are prevented. Another object is to provide a coupling with an internal resilient sealing member that may be easily snapped into a retaining socket and held in place when the coupling is disassembled. Still another object of the invention is to provide a coupling that grips the flared end of the tube in such fashion that a resilient sealing member lies in contact with only one side of the flared portion and that on its inner surface, the outer surface of the flare being supported by a rigid conical seating surface. A further object is to provide a coupling with a resilient sealing member so disposed that the pressure within the conduit increases the sealing pressure against the flared tube and against the coupling body to which the tube is fastened.

Other objects of the invention and the manner they are attained will be apparent from the following specification when read in the light of the accompanying drawings. The novel features of the invention are summarized in the claims.

Figure 2:
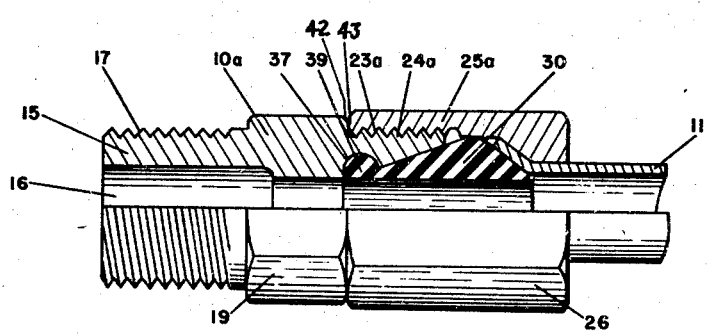
Figure 3:
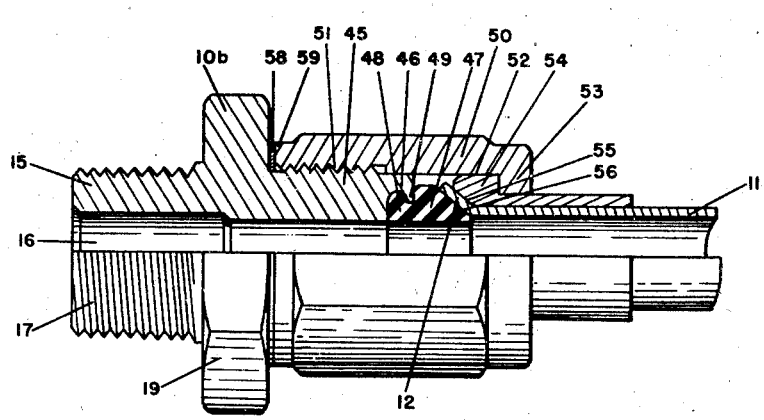

Referring now to the drawings:

Figure 1 is a view partly in axial section of the device of my invention in which the coupling body has a female thread, i. e., is of the "inverted" type;

Figure 2 is a similar view of the device in another form wherein the coupling body has a male thread, i. e., is of the same general type as the well known S. A. E. coupling; and Figure 3 is a similar view of another, and in some respects preferred, form of coupling, showing the invention as adapted to a flared tube coupling of the "AN" type.

Generally, all forms of the invention operate in a similar manner. Each form includes a coupling body to which the flared tube is to be secured, a nut to effect the coupling together of tube and body and a resilient member or nose by which the desired seal is attained. The provision for holding the connection fluid tight is of vital importance because the present invention must handle fluid under high pressure, as for instance 1500 pounds per square inch.

Considering the form of Figure 1 first, there is provided a coupling body 10 to which a tube 11 with a flared end 12 is to be detachably secured.

The body is provided with a nipple portion 15 bored at 16 and externally threaded at 17 for mounting in a pump, tank or other instrumentality. Obviously, means other than the threaded end shown may be used to connect the body to another fluid passageway. The external surface of the body is hexagonal in form as indicated at 19 for engagement by a wrench.

A generally coniform recess 20 is formed on the inside of the body in such position as to flare outwardly toward the open end 22 thereof. Where the coniform recess attains its greatest diameter it merges with an enlarged cylindrical bore that is internally threaded at 23 with a female thread for engagement with a male thread 24 on a nut 25 adapted to be gripped at 26 by a wrench. The nut preferably is a conventional coupling nut of the type utilized with ordinary inverted couplings such as shown, for example, in the Weatherhead Patent No. 1,733,925, issued October 29, 1929.

To snugly receive and provide a seat for the exterior of the flared end 12 of the tube 11, a coniform recess 27 is formed in the nut and flares outwardly toward the open end. The inner end of the recess merges with a bore 28 which receives the tube 11. It will be noted that the flared end of the tube substantially corresponds to the flare of the recess 27.

The actual seal between tube and body is produced by a resilient nose 30 (preferably of rubber or rubber-like material, either natural or synthetic, all of which materials are included within the term "rubber" as used hereinafter). This nose is formed as shown in the drawings. On its exterior it is provided with two coniform surfaces, one to correspond to the coniform recess 20 in the body and the other to the flared end 12 of the tube, which in turn is supported by the coniform recess or seat 27 in the nut. These two coniform surfaces of the nose are connected by a short cylindrical surface 33. The nose has a central opening at 35 to provide, with the aligned openings in the nut and body, a passage for fluid through the assembled parts.

To retain the nose in the body, an annular groove 37 is formed in the body where the recess 20 meets the bore 16 thereof. The nose in turn is formed with an annular bead or ring 39 conforming to the shape of groove 37. By deforming the bead or ring, the resilient nose may be snapped into the groove and held there against accidental displacement by normal handling.

The present device is self-sealing and the greater the pressure of the fluid the tighter the seal. As indicated, this construction will handle high pressures without failure—pressures on the order of 1500 pounds per square inch being common. The initial seal is made when the nut and body are screwed together so that the conical surfaces of the rubber nose 30 are compressed slightly against the coniform recess in the body and the inner coniform surface of the flared end of the tube. However, only a slight degree of initial compression is required to insure a leakproof connection. The nut and body can easily be tightened together sufficiently to withstand the highest pressures for which the fitting is designed, by the fingers only, without requiring any wrenches.

The reason for this is that the internal pressures tend to expand the nose and urge its outer coniform surfaces tightly against the connector and the flared end of the tube. Due to the coniform nature of the sealing surface against the tube, the force effecting the sealing is not only radial but has a longitudinal component to expand the nose longitudinally as well as radially. The expansive force of the fluid within the coupling acts to urge the rubber nose firmly against the flared end 12 of the tube; it will be appreciated that the forces exerted on the flare may be substantial when the internal pressure is high, for the flare receives the expansive force of the nose and also must retain the tube within the coupling against the longitudinal force created by the internal pressure and tending to blow the tube out of the coupling. In the present coupling, the flare is supported against the expansive force of the nose by the rigid conical seat 27 in the nut. The outer surface of the flare is pressed firmly against the seat 27 by the nose, and this action assists in retaining the tube within the coupling against longitudinal forces, for the flare is resiliently clamped between the rubber nose and the seat in the nut with a force which increases as the internal pressure increases, and the nose also supports the flare against collapse. Because of the resilience of the nose, coupling and tube assemblies embodying the invention can withstand severe vibration for long periods of time without failure. This important advantage probably results from the resilience of the connection, and the fact that the clamping action of the rubber nose cannot damage or reduce the thickness of the metal of the flare. Thus the flare retains its full strength, while the resilient connection lessens the stresses in the tube resulting from vibration.

While a leakproof joint can be made by screwing the parts together finger tight, where vibration is encountered it may be necessary to tighten the couplings with wrenches to prevent accidental loosening of the nuts. Shoulders 42 and 43 on body and nut, respectively, limit the inward movement of the nut and provide a stop against which the nut can be tightened. A conventional lock washer can be disposed between these shoulders if necessary.

The form of the invention shown in Figure 2 is similar in all respects but one to the construction just described. In Figure 2 the body 10a is shown as having a female thread and a nut 25a a male thread, and the body is provided with a male thread 23a and the nut 25a with a female thread 24a. The rubber nose projects beyond the end of the threaded portion 23a, and the nut 25a may be a standard nut of the S. A. E. type. In other respects the two forms are similar and like reference characters are used throughout to designate corresponding parts.

In Figure 3 of the drawings, I have shown the invention as applied to a flared tube coupling of the standard AN type. Here the coupling body indicated generally at 10b is provided with a connecting portion 15 externally threaded as at 17 for connection to another instrumentality and having bore 16 which extends through the entire body. The coupling also has an enlarged hexagonal wrench engaging portion 19 as in the previous modifications.

However, in this modification, the configuration of the rubber nose member is changed. Here the coupling body has an external threaded projection 45 and the bore 16 continues through the projecting portion 45 nearly to the end thereof. Adjacent the end, the bore is enlarged as at 46 to receive the rubber nose or sealing member 47 which is provided with a bead 48. The bead 48 extends into an undercut portion of the enlarged recess 46 and is retained in position by the inwardly extending lip or flange 49 of the projecting portion 45 of the body. Preferably the undercut is produced by machining the body with the lip 49 extending axially outwardly, and spinning or otherwise deforming the lip inwardly to the position shown. The machining operations are thus simpler than those required by the previous modifications, and because of the reduced size of the recess, the fitting is stronger and less rubber is required.

In this modification the nut 50 is shown as being of the standard AN type embodying internal threads 51 to engage the tthreads of the projection 45 and an internal cylindrical surface 52 terminating in an inwardly extending flange 53 which engages a corresponding flange on the coupling sleeve 54. The head of the sleeve 54 is formed with a hollow coniform seat 55 which engages the exterior of the flared end 12 of the tube 11.

The conical end surface 56 of the sealing member 47 engages the inner surface of the flared end 12 as before. The action is substantially as described with respect to the previous modifications, for the initial seal is made by screwing the nut onto the body until the flared end of the tube engages the conical surface of the rubber sealing member; the pressues within the tube and coupling act outwardly against the member 47 to increase the sealing pressure exerted against both the inner walls of the recess of the body and the inner surface of the flare in the manner previously described. The conical surface 55 of the sleeve 54 supports the flare against the forces exerted upon it by the rubber nose member 47, and the flared end of the tube is clamped between the sleeve and the rubber nose member and supported against collapse with a pressure varying wtih the pressure within the tube.

In this modification, I have illustrated a lock washer 58 of the conventional type as being disposed between the end surface 59 of the nut 50 and the hexagonal portion 19 of the body 10b. Obviously the coupling may be used without the lock washer, and similar lock washers may be incorporated in the couplings previously described. It is also to be understood that coupling nuts of the S. A. E. type can be substituted for the nut 50 if desired, and conventional nuts and sleeve assemblies of the AN type may be substituted for the nut 25a of the modification shown in Figure 2. Also fittings of the inverted type may be constructed with rubber sealing or nose members of the general configuration shown in Figure 3.

In all forms of the invention, I prefer to use rubber having a durometer hardness of about 60, although this may be varied within reasonably wide limits. Such material is soft enough to make the initial seal and yet strong enough to resist undue expansion by the internal fluid pressure. It will be noted that the rubber nose members in all three forms of the invention are thickest, and thus strongest, in the regions where they are not supported externally by engagement with either the flared tube or the inner wall of the recess in the coupling body.

The coupling bodies, nuts and sleeves may be manufactured of materials ordinarily used for devices of this general character such as, for example, steel, aluminum brass, aluminum bronze, and for some services, plastics. While the drawing does not show clearances between the cylindrical surfaces of the nuts and the tubes or sleeve, or between the sleeve and tube, the clearances ordinarily found in corresponding parts of conventional flared tube couplings are preferably incorporated in the couplings of the present invention. For example, total clearances on the order of about 0.010 inch on the diameters, between tube and nut or sleeve, and between sleeve and nut are satisfactory, and will permit sufficient freedom of movement of the tube with respect to the nut.

The terms "coniform" and "conical" have been used throughout this specification to describe various sealing surfaces. This disclosure, including the claims, is not limited to a literal definition of these words. A surface that is substantially coniform or conical is within the concept of this invention.

From the foregoing description of preferred forms of my invention, it will be evident that I have provided advantageous flared tube couplings which overcome the defects of couplings of previous types. My couplings are simple and can be manufactured rapidly and economically. Because of the resilient sealing arrangement, high pressures can be held without leakage even though the couplings are only finger tight. The reilient nose member prevents damage to the flare of the tube and reduces transmission of vibration to the tube, thus enabling the connection to stand up under high pressures and severe operating conditions for long periods of time.

Those skilled in the art will appreciate that various changes and modifications may be made without departing from the spirit or scope of my invention. Accordingly, it is to be understood that my patent is not limited to the preferred forms described herein or in any manner other than by the scope of the appended claims.

I claim:

1. A flared tube coupling comprising a nut having a conical seat adapted to engage the exterior surface of the flared end of a tube, a coupling body, said body and nut having cooperating threads whereby they may be secured together, said body having a recess therein, a resilient rubber sealing member carried in said recess and engaging and sealing against a wall thereof, said sealing member having a nose portion adapted to engage and seal within said flared end of the tube, said nut, body and sealing member having aligned fluid passages therethrough, the pressure of fluid within said passages increasing the sealing pressure between said sealing member and said body and the sealing pressure between said sealing member and the interior surface of said flared end of the tube, said sealing member clamping said flared end against said conical seat of said nut, said conical seat supporting said flared end against the expanding force exerted by said sealing member.

2. A flared tube coupling comprising a nut having a conical seat adapted to engage exterior surface of the flared end of a tube, a coupling body, said body and nut having cooperating threads whereby they may be secured together, said body having a recess therein, a resilient rubber sealing member carried in said recess and engaging and sealing against a wall thereof, said sealing member having a nose portion adapted to engage and seal within said flared end of the tube, said nut, body and sealing member having aligned fluid passages therethrough, the pressure of fluid within said passages increasing the sealing pressure between said sealing member and said body and the sealing pressure between said sealing member and the interior surface of said flared end of the tube, said sealing member clamping said flared end against said conical seat of said nut, said conical seat supporting said flared end against the expanding force exerted by said sealing member, and stop means for limiting the movement of said nut and body toward each other.

3. A flared tube coupling comprising clamping means having a conical seat adapted to engage the exterior surface of the flared end of a tube, a coupling body, said body and clamping means having cooperating threads whereby they may be secured together, said body having a recess therein, a resilient rubber sealing member carried in said recess and engaging and sealing against a wall thereof, said sealing member having a nose portion adapted to engage and seal within said flared end of the tube, said clamping means, body and sealing member having aligned fluid passages therethrough, the pressure of fluid within said passages increasing the sealing pressure between said sealing member and said body and the sealing pressure between said sealing member and the interior surface of said flared end of the tube, said sealing member clamping said flared end against said conical seat of said clamping means, said conical seat supporting said flared end against the expanding force exerted by said sealing member, stop means for limiting the movement of said clamping means and body toward each other, and locking means associated with said stop means for preventing accidental loosening of said clamping means and body.

4. A coupling body, a nut having a passage therethrough, a threaded portion and a conical seat adapted to engage exterior surface of the flared end of a tube extending through said passage, said body having threads adapted to cooperate with the threads on said nut whereby said body and nut may be secured together, said body having a recess therein, and a rubber sealing member carried in said recess and engaging and sealing against a wall thereof, said sealing member having a nose portion adapted to engage and seal within said flared end of a tube secured to the body by the nut, said body and sealing member having aligned fluid passages therethrough, the pressure of fluid within said passages increasing the sealing pressure between said sealing member and said body and the sealing pressure between said sealing member and the interior surface of said flared end of the tube.

5. A tube coupling comprising a body member and a nut adapted to be removably and telescopically secured to the body, a coniform recess in said nut and a recess in said body member, said recess opening toward one another to provide an enlarged opening in said body member and nut when they are secured together, a resilient nose member, means to retain said nose member in said body member recess, said nose member having such external shape as substantially to fill said enlarged opening, a tube with a flared end positioned inside said nut between the nut coniform recess wall and a portion of the external surface of said nose, and openings in said nut, body member and nose to permit passage of fluid therethrough, the fluid pressure tending to expand said nose into tight sealing relation with said body member and said flared end of said tube.

6. A tube coupling comprising a body member and a nut having axial passageways therethrough and adapted to be removably secured together, a coniform recess in said nut and a recess in said body member opening toward the recess in the nut to provide an enlarged opening in said body member and nut when they are secured together, an annular groove in said body member recess, a resilient rubber nose member with an annular bead adapted to be seated in said groove, said nose member having such external shape as substantially to fill said enlarged opening and permit reception of the flared end of a tube inside said nut between the nut coniform recess wall and a portion of the external surface of said nose and an axial passage through said nose to permit fluid passage therethrough, the fluid pressure urging said nose into tight sealing relation with said body member and said flared end of said tube.

7. A tube coupling comprising a body member and a nut adapted to be removably and telescopically secured to the body, shoulders on said body member and nut adapted to abut each other and limit the extent to which said parts can be telescoped together, a coniform recess in said nut and a recess in said body opening toward the recess in the nut to provide an enlarged opening in said body member and nut when they are secured together, an annular groove at the base of said body member recess, a resilient nose member with an annular bead adapted to be seated in said groove, said nose member having such external shape as substantially to fill said enlarged opening and permit reception of the flared end of a tube inside said nut between the nut coniform recess wall and a portion of the external surface of said nose, and openings in said nut, connector and nose to permit passage of fluid therethrough, the fluid pressure tending to expand said nose into tight sealing relation with said body member and effect a tight seal against said flared end of said tube.

8. A tube coupling comprising a body member and a nut, a male thread on said body member and a mating female thread on said nut by which said body member and said nut are removably secured together, a coniform recess in said nut and a coniform recess in said body member said recesses flaring outwardly toward one another to provide a double coniform opening in said body member and nut when they are secured together, an annular groove at the apex of said body member coniform recess, a resilient nose member with an annular bead adapted to be seated in said groove, said nose member having such external shape as substantially to fill said double coniform opening and permit reception of the flared end of a tube inside said nut between the nut coniform recess wall and a portion of the external surface of said nose, and openings in said nut, body member and nose to permit passage of fluid therethrough, the fluid pressure tending to expand said nose into tight sealing relation with said body member and said flared end of said tube.

9. A tube coupling comprising a body member and a nut, a female thread on said body member and a mating male thread on said nut by which said body member and said nut are removably secured together, a coniform recess in said nut and a coniform recess in said body member said recesses flaring outwardly toward each other to provide a double coniform opening in said connector and nut when they are secured together, an annular groove at the apex of said body member coniform recess, a resilient nose member with an annular bead adapted to be seated in said groove, said nose member having such external shape as substantially to fill said double coniform opening and permit reception of the flared end of a tube inside said nut between the nut coniform recess wall and a portion of the external surface of said nose, and openings in said nut, body member and nose to permit fluid passage therethrough, the fluid pressure tending to expand said nose against said body member and said flared tube.

ROBERT E. HEROLD.

REFERENCES CITED

The following references are of record in the file of this patent:

UNITED STATES PATENTS

| Number | Name | Date |
|---|---|---|
| 549,902 | Dockery | Nov. 19, 1895 |
| 2,301,280 | Howe | Nov. 10, 1942 |
| 2,362,686 | DeLano | Nov. 14, 1944 |